US011024106B2

(12) United States Patent
Ansley

(10) Patent No.: US 11,024,106 B2
(45) Date of Patent: Jun. 1, 2021

(54) STUDENT SAFE DISMISSAL

(71) Applicant: Denise Ansley, Willis, TX (US)

(72) Inventor: Denise Ansley, Willis, TX (US)

( * ) Notice: Subject to any disclaimer, the term of this patent is extended or adjusted under 35 U.S.C. 154(b) by 0 days.

(21) Appl. No.: 16/846,552

(22) Filed: Apr. 13, 2020

(65) Prior Publication Data

US 2020/0327762 A1 Oct. 15, 2020

Related U.S. Application Data

(60) Provisional application No. 62/834,198, filed on Apr. 15, 2019.

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 9/00*** | (2006.01) |
| ***G06T 1/00*** | (2006.01) |
| ***G06T 7/00*** | (2017.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |
| ***G07C 9/28*** | (2020.01) |
| ***G06Q 50/20*** | (2012.01) |

(Continued)

(52) U.S. Cl.

CPC ............... *G07C 9/28* (2020.01); *G06Q 50/20* (2013.01); *G07C 9/253* (2020.01); *G07C 9/27* (2020.01)

(58) Field of Classification Search

CPC . G07C 9/28; G07C 9/27; G07C 9/253; G06Q 50/20

USPC ........................................................ 340/5.53

See application file for complete search history.

(56) References Cited

U.S. PATENT DOCUMENTS

| | | | |
|---|---|---|---|
| 10,248,905 B1 * | 4/2019 | Beatty | G06K 7/10762 |
| 2013/0162397 A1 * | 6/2013 | Cano | G06Q 10/02 340/7.55 |
| 2020/0066129 A1 * | 2/2020 | Galvez | G01C 21/20 |

OTHER PUBLICATIONS

Asif Ahmed, Asif Karim, Sami Azam, Bharnidharan Shanmugam, Mirjam Jonkman, An Intelligent and Secured Tracking System for Monitoring School Bus, 2019 International conderence on Computer Communication and Informatics, ICCCI—2019, Coimbatore, India (Year: 2019).*

* cited by examiner

*Primary Examiner* — Tanmay K Shah
(74) *Attorney, Agent, or Firm* — David McEwing

(57) ABSTRACT

System and method managing dismissal of students from school to parents/guardians (custodians) safely to avoid injury to students from disorganized movement of vehicles or transfer of custody to unauthorized individuals. The procedure monitors and controls the admission of vehicles to a dismissal zone utilizing bar code registration. Other recognition methods such as RFID tags or facial recognition may be used. The registration may be displayed by the vehicle or the custodian. Students are dismissed from the building only when a custodian's vehicle enters the dismissal zone. The vehicles may be positioned in an order.

(Continued)

Entry of the custodian vehicle is communicated into the school. There may be a school representative present in the dismissal zone with a scanner. The scanner may be in communication with teachers or a central control point within the school. The students may exit from the school in the order of standing vehicles of custodians.

20 Claims, 3 Drawing Sheets

(51) Int. Cl.
*G07C 9/27* (2020.01)
*G07C 9/25* (2020.01)

| G/L | STUDENT NAME | BARCODE | TEACHER | Assembly | Exit |
|---|---|---|---|---|---|
| 5 | Mary Smith | | Carol Ambrose | X | X |
| 3 | Robert Smith | | Russell Crowe | X | X |
| 5 | Timothy Brown | | Carol Ambrose | X | |
| 4 | Juanita Perez | | Hellen Soto | | |
| 4 | Robert Jackson | | Hellen Soto | | |
| 2 | Kathy Klein | | Hellen Mirriam | | |
| 5 | Jill Jacobs | | Carol Ambrose | X | |
| 4 | Robert Klein | | Hellen Soto | | |

FIG. 2

STUDENT SAFE DISMISSAL

RELATED APPLICATION

This application claims priority to provisional application No. 62/834,198 filed Apr. 15, 2019 and entitled "Supervised Student Dismissal and Collection". This application is incorporated in its entirety by reference herein.

FIELD OF USE

This application pertains to a device and method for controlling and safeguarding the dismissal of elementary, middle and high school students. Dismissal is the activity at the conclusion of the school day is a very hectic and confusing time. There is a constant danger that students will be apprehended in proximity to the school grounds. There is also a danger that predators may lure unaccompanied students into cars at the school dismissal zone. This disclosure includes ensuring the students (particularly younger students) are safely delivered to their parent or guardian for transport from the school.

NATURE OF PROBLEM

It is difficult for the schools to supervise the dismissal of students and ensure the students are appropriately delivered to their parent or guardian. Frequently, many parents arrange for their child to be picked up after school and driven home or extracurricular activity or otherwise. Frequently this automobile transport of children crowds the school entrance and exit. In some circumstances, the press of numerous automobiles causes active lanes of traffic to be deadlocked by parents waiting to be able to drive their car into the school entrance. This can present danger to children attempting to enter their car standing in or blocking a lane of traffic.

There is also a danger that predators may attempt to entice young unaccompanied students into vehicles during this very hectic, crowded and confusing process. The likelihood of tragedy is obvious. Students may be kidnapped by non-custodial parents in violation of a court order. It is known that such kidnapped children can be transported across state lines and disappear forever in the possession on the non-custodial parent. Dismissal zones can also be used for youth gangs to recruit and gather members.

In some instances, the schools have adequate space to allow one or more car lanes be occupied by parent cars (standing) during the dismissal activity at the end of the school day.

The efforts of a school or particularly a teacher supervising the dismissal activity has a very difficult task in attempting to control dismissal and ensuring the children are safely picked up that a proper parent of guardian.

SUMMARY OF DISCLOSURE

This disclosure teaches a method and system that controls the student dismissal practice and the transfer of custody to a preauthorized and validated custodian such as a parent, guardian or authorized agent. The method and system utilizes technology to identify and validate the custodian and correlates or matches the custodian to a specifically identified student. When the custodian is validated, the student can be released from the school building and transfer to the custodian can be monitored.

As noted, the time of school student dismissal is crowded and congested with vehicles of parents, etc. arriving to pickup students. The disclosure also teaches a system and method to control this congestion and arrange a controlled number and order of vehicles of validated custodians to enter the dismissal zone. The appropriate students for this controlled group can exit the school building and proceed directly to the appropriate vehicle. The school dismissal zone can be clear of student occupied vehicles and another controlled group of vehicles can enter the dismissal zone. The process may be repeated.

The disclosure utilizes machine scannable bar codes. The bar codes can be either 1D or 2D. A 1D barcode is an individually pattern of bars and spaces. A 2D barcode is code design of a unique combination of spaces and shapes. This also termed a "QR code". As used in this disclosure, the term bar code will be deemed to include QR codes. It will be appreciated that QR codes can display an image or include a URL that directs the user to an image. The code can be read by a bar code scanner and inputted into computer memory. It will be appreciated that the bar code scanner may be an application used in conjunction with the camera of a smart phone or tablet such as an iPhone or iPad. Information imbedded into the bar code or contained in computer memory and correlated to the unique barcode may be displayed responsive to the unique bar code. The information may include a student's name, grade level, teacher, classroom number, and student photo. The information may also include information regarding the custodial parent/guardian such as complete name, address, social security number, telephone, etc. The information may also include name and photo or person (authorized agent) authorized by the parent/guardian to collect a student from school.

The method of this disclosure may begin with one or more vehicles entering the school dismissal area (dismissal zone). Each vehicle will display a dismissal card. The card will display a bar code. The code may be scanned and information displayed identifying the student or students that are authorized to be discharge to the vehicle occupant, i.e., identified parent/guardian or authorized agent.

Scanning may be performed by a teacher or other school personnel using a bar code scanner. Alternatively, the scanning may be performed by a mounted bar code scanner positioned in the dismissal zone and automatically scanning each vehicle as it enters the dismissal zone.

Information embedded in the bar code or stored in computer memory correlated to the unique bar code may be displayed. The displayed information may be communicated to a teacher within a classroom occupied by a subject student. The communicated information notifies the teacher that the student's ride has arrived. As more vehicles arrive and information displayed from the dismissal cards, the teacher is notified that the rides for additional students have arrived. The teacher can begin organizing the students to be discharged in an orderly fashion coordinated to the vehicles positioned adjacent to the school building. The students can be organized such that the students are ordered in the same sequence as the cars positioned in a line. (A configuration of ordered line of standing vehicles is referred to as a "flight".) In this way the students are released in an orderly fashion thereby reducing chances of a child entering an unauthorized car.

The disclosure also teaches a dismissal zone system for aligning custodian vehicles that allows one or more rows of controlled vehicle positioning optionally proximate to a school building exit. This allows multiple flights to be simultaneously readied by school personnel.

BRIEF DESCRIPTION OF THE DRAWING

The accompanying drawings, which are incorporated in and constitute a part of the specification, illustrate preferred embodiments of the disclosure. These drawings, together with the general description of the disclosure given above and the detailed description of the preferred embodiments given below, serve to explain the principles of the disclosure.

FIG. 2 is a display screen displaying information retrieve and unique to each separate bar code. This information is displayed to classroom teachers who have custody of the children at the final period of the classroom day.

DETAILED DESCRIPTION OF THE DISCLOSURE

Figure 1:
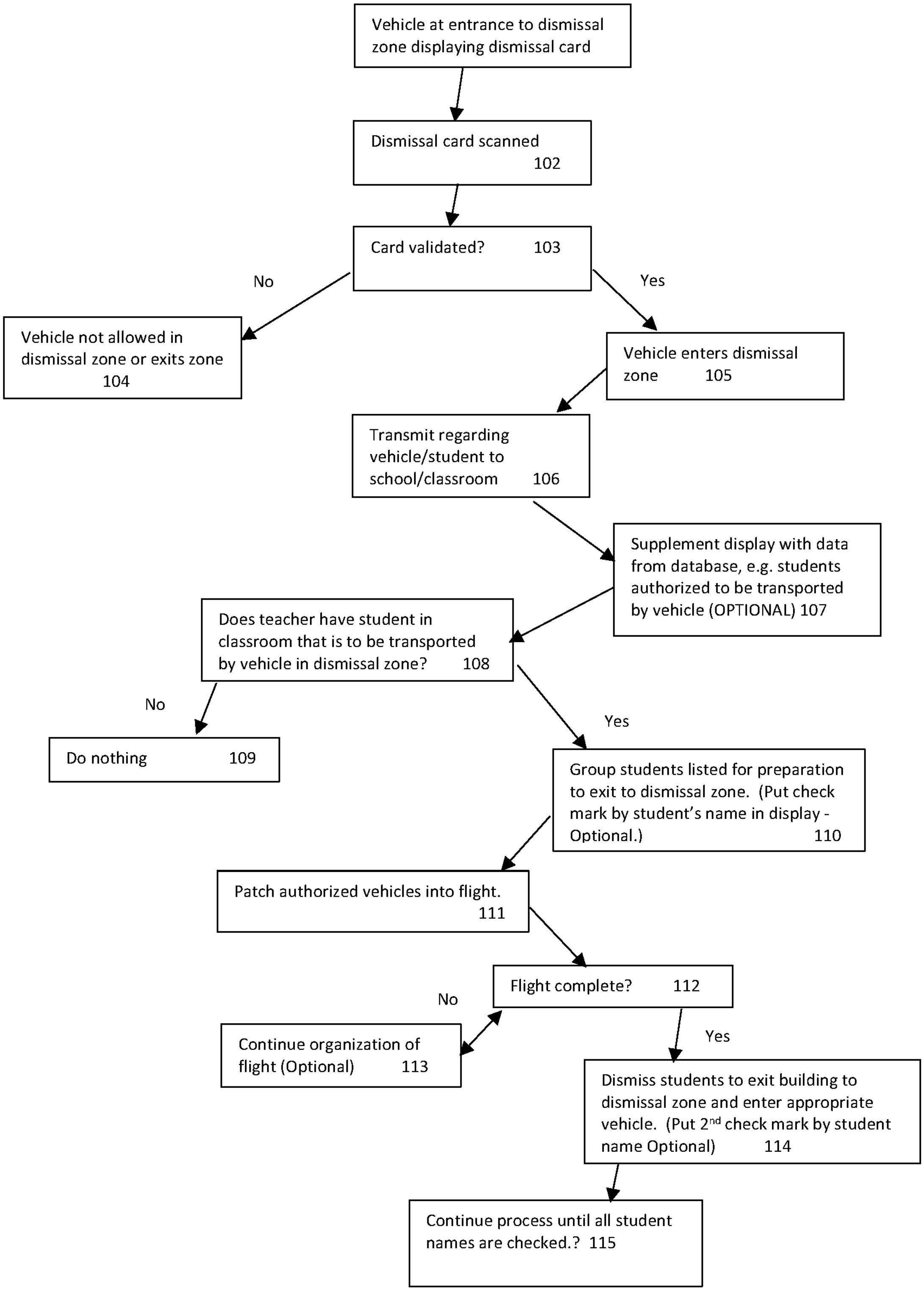
FIG. 1 is a logic flow diagram showing the steps of one embodiment of the disclosure.

This disclosure may comprise a part of a school safety policy. It is intended that all students are to be safely and securely transferred (dismissed each day) from the school to waiting vehicles for transport from the school. The safety policy utilizes prior registration of vehicles or custodians by issuing (or allowing the parent/guardian to create) dismissal cards wherein the cards contain an electronic identifier. The dismissal cards may be created by the parent/guardian utilizing application software via the school safety policy system. This allows the parent/guardian to conveniently and promptly update the vehicle authorizations, including revoking prior dismissal cards when necessary to revise the persons authorized to collect students. These changes may be required due to changes in domestic relationships.

The vehicles may be school buses, each having a list of students assigned to the bus for transportation home, etc. The vehicles may be private autos, SUVs, etc., owned or operated by a student's parent or guardian, i.e., "custodians". The reference to school buses also includes but is not limited to buses operated by day care facilities.

In applications pertaining to dismissal of students for transportation via a school bus, each student maybe required to display his/her student card (containing a bar code) to a scanner on or at the entrance to the bus to make sure each student is authorized to board the bus for transportation home. The students' card may also include a photo image of the student. Only students identified by their student cards as authorized to ride the particular bus may board the bus. Further, this system may automatically inform the bus driver if all students have entered the bus or if there remain missing students. In one embodiment, the school personnel coordinating the dismissal activity can clarify is the missing student did not attend the particular day or is engaged in an after-school activity.

The policy is intended to prevent unauthorized persons from picking up ("collecting" or "receiving custody") a student. This contemplates prevention of kidnapping by strangers or predators as well as by a non-custodial parent. Note that in an embodiment, a parent may change an identification code that validates a person or vehicle used to collect students from a dismissal zone. This is intended to allow the custodial parent/guardian to prevent the non-custodial parent from collecting the student in the event of a domestic dispute or divorce/child custody proceeding initiated during a school year. This is intended to provide flexibility for the parent/guardian to ensure only a properly designated person (parent, guardian, or authorized agent) is allowed to collect a student from school. It will be appreciated that the custodial parent may terminate or suspend the authority of any person to pickup students from school. This may be accomplished by termination or suspension of the dismissal card. This termination or suspension will be automatically communicated to the school and dismissal card database.

The policy also is intended to create structure and organization to the daily dismissal of students. Stated differently, the organized and controlled release of students from the school building will reduce instances of students wandering among standing vehicles looking for their ride home.

This disclosure teaches a system of devices that permits safe and secure dismissal of students, particularly younger students or adolescents from a classroom environment to custody of parents or guardians at the end of each school day. This disclosure also teaches a method monitoring arrival of parents or guardians to the school for the purpose of picking up one or more students and matching the students in the class room to the on-site parent/guardian. In one embodiment, the method records and displays the order of the parent/guardian cars standing in line at the school, thereby allowing a teacher (or other school personnel coordinating student dismissal) to gather and organize the students into an ordered line while either still in the class room or inside the school. The method can be expanded to organize the students into lines for boarding a correct school bus. It will be appreciated that the method reduces the number and duration of individual students wandering unsupervised during the often confused time during school dismissal.

The system of the disclosure utilizes a printer, data entry mechanism and software allowing 1D, 2D or QR bar codes to be recorded that matches the parent/guardian identifying information and student identifying information correlated to one or more parent/guardians. The system also includes a bar code reader and a data display. The system can include RFID technology to identify authorized vehicles or drivers. The system may also utilize facial recognition software and technology to identify and confirm the authorization of individual drivers to pickup students from the dismissal zone. This may include iOS Vision Framework, Google Vision API, DLIB face landmarks API, etc. The facial image captured by the scanner or camera can be matched with a photo supplied by the parent or guardian at the time the dismissal card is created and data transmitted to the school database. In another embodiment, the system may utilize electronic fingerprint analysis to identify authorized drivers. The identifying information can be correlated to a data base containing further identifying information such as student name, parent/guardian name, authorized agent identity, as well as vehicle description, license plate number, bus identifier, (e.g., alphanumeric or color identifier), address, telephone number, mobile telephone number, photo, identity verification password, etc.

As used herein, driver may refer to any individual authorized by the custodial parent or guardian to pickup or collect students from the dismissal zone. Such individuals may include "authorized agents" such as employees, friends, relatives or the like. These authorized agents may be included in the term "custodians" and authorized to receive custody of the proper student. The individual drivers will be identified in the dismissal card. Each such individual will have their own dismissal card. Therefore the card may not be specific to a vehicle.

The school may designate an area adjacent to the school building as a dismissal zone. This area will preferably be served with a vehicle entrance and exit to a public right of way or road. Preferably the zone will be configured such that vehicles may line up end to end in one or more lanes. Preferably the lane will be adjacent to a sidewalk allowing students to walk along the line of vehicles.

The bar code reader or scanner will be in wireless communication with at least one data display device. The bar code scanner may be positioned in the school dismissal zone. The data display device may be positioned in a classroom inside the school building. Each classroom may have its own data display device or there may be a centralized control point within the school in addition to school personal possessing a bar code scanner in the dismissal zone. The display device will display the name and related information regarding the custodian, e.g., parent, guardian or authorized agent. It will also display the name and related information regarding one or more students for whom the custodian is authorized to collect and transport from the school. The displayed information may include a photo of the student and the school classroom where the student is at the dismissal time.

In an embodiment, the display screen may display a description of the parent/guardian's vehicle based upon information received at the time the parent/guardian registered and obtained the dismissal card.

It will be appreciated that the system may include use of additional communication devices such as two way radio, e.g., "walkie/talkie" or similar. The system can also utilize cellular or mobile phones. This can include "smart phone" capable of displaying an image of a custodian, custodian vehicle or the location of the custodian's vehicle. The smart phone or tablet can also read the bar code. It will be further appreciated that the school personnel positioned at the dismissal zone can use the supplemental device to communicate within the school. This may include a central student control point within the school.

The system can alternatively employ RFID technology. The RFID system can be active or passive. The radio frequency utilized may be low frequency, high frequency or ultrahigh frequency. It will be appreciated that the frequency may increase the range of signal transmission and reception. It will be further appreciated that RFID technology is not dependent upon line of sight communication.

As discussed above the data transmitted to the bar code reader or RFID receiver may be correlated to data within a data base. This data base may be contained on a server. This correlated data may have significantly larger data capacity such that a photo image or other large data file size that may be identified, accessed and displayed based upon the scanned bar code. The bar code or RFID systems may be referred to as electronic identifiers. In another embodiment, facial recognition software can be used as an electronic identifier verifying the identity of the vehicle driver. If the driver is not recognized by the system, the driver can be directed to leave the dismissal zone. In this situation, there may be no notice to school personnel that the student's ride has arrived.

In one embodiment, this disclosure teaches a method of organizing and managing school dismissal procedure. In one embodiment, the method begins with a vehicle arriving a school student pickup location, i.e., the dismissal zone. The vehicle may display a dismissal card comprising a bar code. The dismissal card is scanned. If the vehicle does not display a dismissal card or the card is not validated or not recognized by the scanner, the vehicle will be directed to leave the dismissal zone. The parent/guardian or authorized agent may be directed to a different school entrance and to enter the school building to verify the driver's status.

Successful reading of the bar code displayed on the dismissal vehicle will cause information to be displayed to school personnel. The information displayed informs that a custodian authorized to receive custody, i.e., pickup (collect) one or more identified students has arrived in the dismissal zone. This information can be transmitted automatically to one or more teachers then having an identified student in their classroom. This is stage 1 of the method.

It will be appreciated that in one embodiment, the scanning of a valid dismissal card will cause relevant information related to the vehicle or custodian represented by the dismissal card to be retrieved from a server (including CPU or microprocessor) and displayed electronically to school personnel, e.g., classroom teachers.

The information communicated to the applicable teacher may include the location of the custodian vehicle in the dismissal zone. It will be appreciated that there will likely be multiple vehicles crowding in the dismissal zone. The dismissal zone may be configured to have separate identified lanes for vehicles to stand while awaiting discharge of the student. To mitigate the crowding of vehicles, the vehicles may be assigned to a location. The vehicles can be grouped as standing in a designated lane. This grouping of vehicles can be termed a "flight". A teacher may have an applicable student (understood to be a student identified to be picked up by an identified custodian in a vehicle standing in a particular flight) grouped with other student who have been identified to be picked up by other custodians in similarly identified vehicles standing within the same flight or flight lane. Again, a flight may be a designated grouping or batch of vehicles standing together in the dismissal zone. The grouping of students awaiting discharge from the building and to the dismissal zone is stage 2 of the procedure. In an embodiment, flight lanes can be organized by class or school grade.

The final stage (stage 3) will be discharging the grouping of identified students from the building to walk to the appropriate custodian vehicle for transportation from school property.

In one embodiment the movement of each student through each stage of the procedure may be displayed and recorded by the system. The record may be stored on the cloud or in other suitable media. An individualized student page display may designate the student's initial presence in a designated classroom. The display may indicate whether a custodian vehicle has arrived in the dismissal zone. The display may also indicate that such vehicle has arrived and the student has been conducted to stage 2, such as a hallway outside of a classroom or other suitable location such a gymnasium where the student can be grouped with other students (perhaps of different grade levels) to be discharged to the same flight of vehicles. The order of students can be arranged to match the order of custodian vehicles in a flight lane. The individualized display for the student may further designate that the student has been discharged to the dismissal zone. This constitutes stage 3 of the dismissal procedure.

In another embodiment, the dismissal procedure comprises the following steps:

1. A server will have the function of registering car arrivals, so teachers can have real-time information and deliver the students efficiently.

Each time a car arrives, it has to pass through three registration stages:

1. A teacher will use a scanner to read the dismissal card's barcode and generate Flights.
2. Classroom teacher roles will check their students as they leave the classroom manually.
3. Dismissal teacher roles will check the students when they leave the hallway by human criteria or using the student card. In some embodiments, this step may utilize a second scanner.

Each registration stage must be saved when the student passes through the stage and after each student dismissal.

It will be appreciated that the display may be time stamped to show the time at which each step was accomplished. It will be further appreciated the dismissal zone may be under video surveillance. The time stamped discharge of an individualized student may be automatically recorded showing the student exiting the building, walking to the "flight" of vehicles and recording the student entering a vehicle. The video and dismissal information/sequence may be archived for a pre-determined term, e.g., 48 hours.

It will be appreciated that no student will be dismissed from the classroom prior to an authorized custodian vehicle entering the dismissal zone. No student is dismissed from the school building until a full flight of students correlated to the authorized custodian vehicles is ready to be collected, i.e., discharged to the waiting vehicles. No student is left standing at a curb waiting for a ride.

Dismissal Card and Student Card Registration

Registration will typically occur at or prior to the start of a school year. Registration shall utilize data of students enrolled in the school. The database may display information regarding each student in 4 columns comprised of 1. Grade Level
2. Student Name
3. Student ID (Barcode)
4. Teacher Name
5. Photo (optional)

Also, in this view, parent/guardian (custodian) information will be saved, including the barcode associated with its corresponding student. This information can include name, address, social security number, drivers license number and photo, vehicle description and VIN of the custodian. It may also include data regarding any "authorized agent" designated by the parent/guardian to pick up a student. It will be appreciated that the terms authorized agent, parent and guardian are all included within the term custodian.

A dismissal card may be created by a parent/guardian utilizing software of the disclosure (school safety policy software application, i.e., "app"). The registration process includes the name(s) of the custodian, i.e., parent/guardian or authorized agent to collect or receive a student from school. The information shall include further identifying information such as social security number(s), home address, and telephone numbers including cell phone numbers. An emergency contact may also be designated.

The registration may request mandatory information from the parents or guardians regarding the custodian who will pick up the students. The app will print dismissal cards with a barcode for each student.

The following information may be required:

1. Name and last name
2. Driver's license of custodian
3. Vehicle license plate number
4. Student's ID
5. Relationship with the student
6. Phone number The Registration View will also be able to deactivate dismissal cards.

To access to the Registration View, the parent/guardian role will access to a link that will redirect them to the login page where they will proceed to request the dismissal cards. Modification of the authorization information and creation of new dismissal cards will also cause automatic updating of the authorization information at the school. This will ensure that the deactivated (revoked) dismissal cards will not be recognized by the electronic identifier scanners of the school. A revoked dismissal card cannot be used to collect students. In an embodiment, the scanner will transmit a custodian bar code to the central server for validation. If the bar code is returned invalid, the vehicle driver will be directed from the flight lane to the school office for clarification.

The registration shall also list the name, grade level, student ID and teacher name of each student that the custodian is authorized to collect.

There may be two types of barcode:

a. Dismissal card barcode: This barcode is related to the parent or guardian who owns the card. There can be more than one dismissal card for each student. Each dismissal card will have different barcodes to identify and register the custodian authorized to receive custody of the dismissed student in the dismissal zone.
b. Student card barcode: This barcode is related to the student. Each student will have a unique barcode that is related to the custodian's barcode(s) of the dismissal card(s). In an embodiment, the student card may be checked at the time of dismissal and prior to entry into a standing vehicle. In another embodiment, the student card bar code may contain the student's ID number that has been assigned by the school. The student card may also include a photo of the student.

Dismissal Card

The dismissal card (which may be created by the parent/guardian using application software) will be comprised of cards with information about the student (name, grade, teacher, student ID and barcode) and information about the card's owner, i.e. custodian (parent/guardian or authorized agent). The information may include the custodian address, telephone number, email and the vehicle description and license plate number. In an embodiment, the program and communication system between the custodian and school may incorporate authentication technology such as two factor authentication or public and private key infrastructure. In an embodiment, the dismissal card may be a non transferable window sticker displaying a bar code, RFID tag or similar.

The School-Administrator may have access to the format of the dismissal cards and could edit it if necessary, but the barcode or RFID requirement will be mandatory.

It is possible to have more than one student listed on a dismissal card with their corresponding information and individual barcode. Each student's bar code is correlated with the barcode of the appropriate custodian (authorized parent/guardian or authorized agent).

There may be an option to create extra dismissal cards for the same student, but the barcode will be associated with the owner (parent/guardian) of the card. It will not be possible to have two dismissal cards for the same custodian. Extra dismissal cards will be required when a student will be picked up by different parents/guardians or authorized agents.

At the time of parent/guardian registration, there may also be created individual student cards. In one embodiment, this card will be used to identify students in the hallway. This identification will activate the "Hallway Checkmark" on the dismissal list shown in the flight view.

Student Cards will have the following information:

1. Photograph
2. Name: Optional
3. Grade: Optional
4. Custodial parent/guardian
5. Unique bar code Barcode: The student barcode will be related to the barcode on the dismissal cards. In an embodiment, a student barcode information may be displayed on a dismissal card. As noted above, the student barcode may be correlated to the student's individually assigned student ID number.

The use of the student card as a verification in the dismissal stage is optional. The school-administrator can decide if the verification is performed manually or by the student card's barcode.

Student Flight Lists

This list is created each day, beginning with the first validated vehicle displaying a dismissal card. Recall that in certain embodiments of the disclosure, each validated vehicle is assigned to one of multiple lanes in the dismissal zone.

In such embodiments, the dismissal list will be divided into tables that will represent the lanes of each flight. The list will show the dismissal date with the following columns:

Grade: For the classroom teacher, the list will be organized by grade as default, grouping each grade together, starting from Pre-Kinder (PK) grade level. The classroom teacher will see their grade level highlighted on the flight list. For the dismissal teacher (or other school personnel coordinating the pickup of students in the dismissal area), the list will be organized by the position of each car as default.

Student Name

Classroom check mark: This check mark will be activated by the classroom teacher role when the student leaves the classroom. Each classroom teacher will only be able to check a student name from his/her own class.

Hallway check mark: This check will be activated by the dismissal teacher role when the student leaves the building, either by user criteria or using the student card. This is at stage 3 of the dismissal process.

The flight view visualization can be customized by the user, changing the list organization by grade, car, or name and hiding/showing columns.

Flight View Format (see FIG. 2)

Flight list update: The flight list is updated in real-time, so teachers can see the next student he/she needs to dispatch. The flight list will display an indicator that shows if the flight is in the process of being loaded. When a flight completes, i.e., all applicable students have exited the school building and have entered the correct vehicle, the flight list is archived. A second flight list may be created for the next group of students to be dismissed. Note that in a preferred embodiment, the list must hold its position on the screen even though it updates in real-time. This is to avoid movement when the user is reading names. This facilitates use of the display.

In other embodiments wherein the dismissal zone comprises more than one vehicle standing lane, the flight list may be organized in tabs, one for each lane and color. The tab quantity depends on the number of students and total number of flights for the day.

Figure 3:
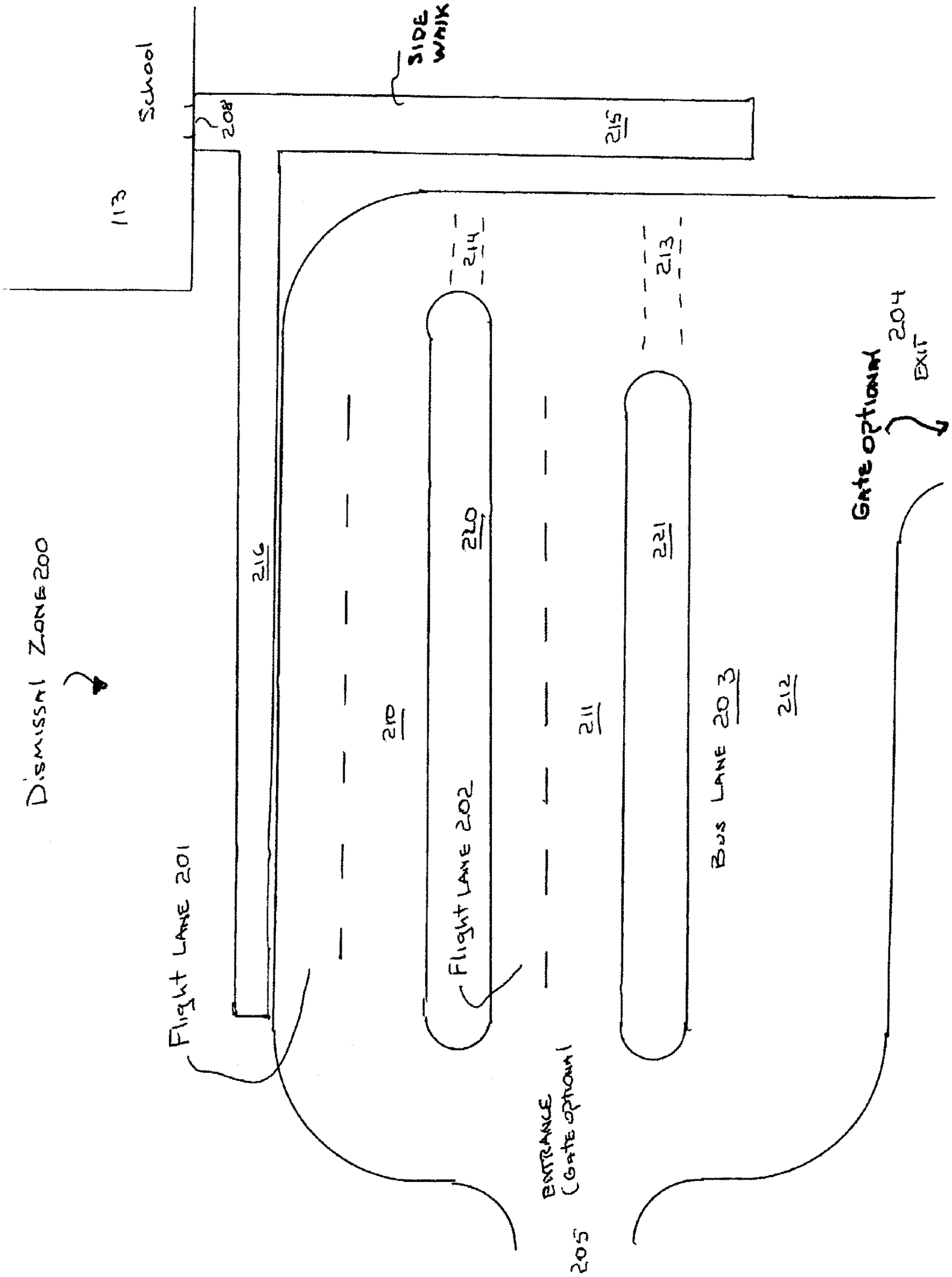
FIG. 3 is an overview of one or more vehicle lanes for placement or positioning of standing custodian vehicles in preparation for transfer of student custody and subsequent ordered exiting.

Lane Logistics (See FIG. 3)

As discussed above, the dismissal zone may have multiple vehicle standing lanes. Vehicle standing is a vehicle sitting in a lane or row, perhaps with other vehicles in a row, while the drive remains in the vehicle. When a car arrives at the school, the scanner role scan dismissal cards and assign the lane that the custodian should take to receive custody of (collect) the student. If the car inadvertently or accidentally changes lane, the driver will need to pull around and park, and the student will be walked to the car. Vehicle entry or exit from the dismissal zone or individual flight lane may be controlled by a gate or similar controllable barrier.

The school-administrator or authorized school personnel coordinating student dismissal can choose which way to fill the Lanes. In an embodiment, the flight lane specific to the custodian may be preassigned and designated on the dismissal card. The lanes may have two ways to be filled:

Lane by Lane: The cars will fill up lane by lane until the whole flight gets filled. This will be the default configuration.

Alternating cars: The cars will be sent to a Lane in an alternated configuration, i.e. first car: purple Lane, second car: yellow lane, third car: purple lane, etc.

Each flight manages a number of cars determined by the school-administrator, supervising administrator and/or school personnel coordinating the student dismissal. Sometimes there will be more students than cars in a flight list because it's possible that a car will pick up more than one student. When a car arrives and it is registered, it is listed on one of the Flights. When the flight lanes are filled, this flight will be closed and a new flight will be opened. This may be accomplished by the school personnel continuing to scan vehicles that are lined up to enter the dismissal zone. The vehicles comprising a flight may leave when the students have entered the appropriate vehicle. The next flight of vehicles then may proceed to the designated place in the dismissal zone. Alternatively, when all of the vehicles have left, the flight may be closed and a new flight created as replacement vehicles now begin to enter the lane.

The flight list may be edited. This editing may occur after one or several dismissal cards have been scanned and validated. Editing the scanner role can move the custodian to another flight or lane. This situation might happen when a parent has already parked in a lane and, when scanning, is assigned automatically to an alternate lane.

Scanning View

The scanner role may have access to the flight list to verify if a flight or car's information is being updated in real-time. The flight list may display the same information as what other roles see, except for the checkmarks (which aren't useful for the scanner role). Also, the scanning view will have information of the car position within each lane, so the scanner role can check the quantity of cars in the flight. After scanning a dismissal card, the scanner role can erase and move the car to another lane or flight, or change the position of the car within a lane.

If a student has already been dismissed and another (second) custodian appears at the dismissal zone with their dismissal card, the scanner role should see a notification that shows the identity of whomever already picked up the student. The second custodian should consult the school-administrator for any other information in this instance.

Also, the school personnel coordinating student dismissal will be able to erase a student after a dismissal card gets scanned. This would be useful when there are multiple student barcodes on the dismissal card and the parent/guardian forgets to let the scanner role (school personnel in the dismissal zone with the bar code scanner) know that one of the students is absent that day or is staying late for an after-school activity. As stated above, the scanning of the dismissal card may display the names (and other information) of all students associated with the dismissal card.

The super-administrator, school-administrator and/or school personnel coordinating the student dismissal will have access to the data entry views, flight views and archival views. Also, they will have access to visualize the group of barcodes made for each student. With the barcode, there may be the following information attached: student ID, student name, and owner of the dismissal card barcode (custodian).

Search Function

A Search option will be available to find a specific student, using the name or barcode number of the student card. The search will find and highlight a student in a flight list, showing the status of the dismissal. If the transfer of custody has been completed, it must show the flight number, the time of transfer, and the person who picked up the student.

FIG. 1 illustrates a flow diagram of several novel steps of the Applicant's disclosure. Illustrated is the method commencing with a vehicle entering the school dismissal zone. The validity of a dismissal card (displayed by the vehicle) is determined 101. If there is no display or the display is not valid, the vehicle is required to leave the dismissal zone 102. Note that in one embodiment, assess to the dismissal zone is controlled by a gate, operating in conjunction with a sensor detecting and evaluating an electronic identifier. The electronic identifier may be a bar code reader or RFID reader. If the electronic identifier is deemed valid, the gate can open, thereby allow an authorized vehicle to enter the dismissal zone.

Continuing with FIG. 1, data obtained from the electronic identifier (dismissal card) can be correlated with a database of identifiers maintained by the school. The combined data, comprising custodian name, associated student(s) authorized to be collected by the custodian, etc., can be communicated to one or more school personnel, e.g., class room teachers 103 & 105. Also the vehicle may be assigned a location within the dismissal zone. In an embodiment, this assignment may be accomplished by opening alternate gates 104.

The displayed data may include the students that are authorized to be collected by the custodian now standing in the dismissal zone 106. If a student is within a classroom of a teacher receiving the display, the teacher may dismiss the student from the classroom to a space where other similarly authorized students are assembled 108. A check mark may be electronically placed on the display next to the student's name to signify that the student's authorized transportation is standing in the dismissal zone and the student is being assembled for the next stage of the dismissal process. If no such student is within the teacher's classroom, the teacher does not need to do anything 107.

The method groups the standing vehicles in the dismissal zone into an ordered flight 109. The order of the vehicles standing is noted and the students are assembled in a similar order. If all of the vehicle spaces available in a lane of the dismissal zone are occupied, the flight is closed 110 and the assembled students can be dismissed from the building to the line of standing vehicles 112. A second check mark can be electronically added to each dismissed student's name signifying that the student has exited the building.

Additional vehicles can be positioned in the dismissal zone, thereby creating another flight. Students associated with this additional grouping or flight can be identified, assemble and then dismissed from the building 113. This process can continue until all students have been accordingly assembled for exit and transport.

In a further embodiment, the identity of the vehicle driver may be ascertained and confirmed to be a custodian. Recall the registration information may include the driver's license number and photo of each custodian.

FIG. 2 illustrates one embodiment of a display screen of the disclosure. This disclosure would be generated as vehicles, displaying the required identifier, i.e., dismissal card, enter the dismissal zone. The first vehicle disclosed two students are authorized to be collected, i.e., Robert & Mary Smith. Mary Smith is in grade level 5 and Robert is in grade level 3. Mary's teacher is Carol Ambrose and Robert's teacher is Russell Crowe. In response to the custodian's vehicle standing in the dismissal zone, the display screen shows that both children have been assembled for dismissal (check mark for "Assembly") and subsequently have exited the building (check mark for "Exit").

Teacher Carol Ambrose has also assembled her students Timothy Brown and Jill Jacobs in response to custodian vehicles now standing in the dismissal zone.

FIG. 3 illustrates one embodiment of a dismissal zone 200. Illustrated are two flight lanes 201, 202. These lanes are the location of standing custodian vehicles (not shown). The vehicles stand in an ordered row in each flight lane. Also shown is a bus lane 203. Students access the verified custodian vehicles via side walks 215, 216 and cross walks 213, 214 to safe boarding areas 220, 221. One or more school personnel may be positioned in this area during the dismissal period.

In one embodiment, when a flight lane is fully occupied by verified custodian vehicles (verified by bar codes, RFID tags, facial recognition or similar), designated students may exit the school building 113 via door 208. Controlled transfer of custody can then take place. Upon completion of the transfer of custody, i.e., the correct students entering the correct vehicles for the entire flight, the vehicles comprising the flight can exit the dismissal zone.

It will be of course appreciated that FIG. 3 disclose only one conceptual embodiment subject of this disclosure. There may be a single flight lane or multiple lanes with or without a separate bus flight lane. It will also be appreciated that access and egress from the dismissal zone may be controlled by gates.

This specification is to be construed as illustrative only and is for the purpose of teaching those skilled in the art the manner of carrying out the disclosure. It is to be understood that the forms of the disclosure herein shown and described are to be taken as the presently preferred embodiments. As already stated, various changes may be made in the shape, size and arrangement of components or adjustments made in the steps of the method without departing from the scope of this disclosure. For example, equivalent elements may be substituted for those illustrated and described herein and certain features of the disclosure maybe utilized independently of the use of other features, all as would be apparent to one skilled in the art after having the benefit of this description of the disclosure.

While specific embodiments have been illustrated and described, numerous modifications are possible without departing from the spirit of the disclosure, and the scope of protection is only limited by the scope of the accompanying claims.

What I claim is:

1. A school student dismissal custodian identification system that identifies the arrival to a dismissal zone of an authorized custodian pre-approved to receive custody of a specifically identified student, transmits the information within school to the school personnel having custody of the specific student and initiates transfer of the student from the school to the custodian comprising:

(a) a unique custodian bar code or RFID identifier possessed by a custodian;

(b) a component containing a bar code or RFID reader to read each custodian bar code or RFID tag and identifying the custodian and a student and directing the custodial vehicle to a location or vehicle order of a group of custodial vehicles in a school dismissal zone;

(c) a transmitter structured to communicate information from the component regarding the arrival of the custodian at a location or order within the dismissal zone to a classroom display of the identified students within a school;

(d) a classroom receiver receiving and displaying custodian vehicle arrival information, corresponding identified students and custodial vehicle location or order; and (e) component for controlling the release of the group of custodial vehicles from the school dismissal zone after completion of transfer of all grouped students into the group of custodial vehicles.

2. The system of claim 1 further comprising a transmitter to communicate to school personnel at the dismissal zone that the specifically identified student is exiting the school building and available to transfer to the identified pre-authorized custodian.

3. The system of claim 1 further comprising a second bar code scanner that identifies the specifically identified student and a transmitter that communicates to the school personnel monitoring the school student dismissal zone that the identified student is exiting the school building and available to transfer custody of the student to the pre-authorized custodian.

4. The system of claim 3 further comprising a student identifier containing a bar code.

5. The system of claim 1 further comprising a bar code that contains a bar code readable image of the pre-approved custodian.

6. The system of claim 4 further comprising a bar code that contains a bar code image of the specifically identified student.

7. The system of claim 1 further comprising a RFID tag for identification of the custodian.

8. The system of claim 1 further comprising facial recognition software for identification of the custodian.

9. A safe and controlled transfer of custody of identified students from school to custodian vehicle method comprising the steps of:

(a) monitoring entry of vehicles into a dismissal zone of a school wherein each vehicle is marked with a remotely readable electronic identifier;

(b) using a scanner device to identify each vehicle as authorized to receive custody of one or more specifically identified students;

(c) directing each vehicle to a specified location or vehicle order within the dismissal zone of the school;

(d) transmitting a signal to at least one receiver within the school to announce vehicles authorized to collect the identified students have entered the school dismissal zone, vehicle location, and identity of corresponding students;

(e) assembling a group of identified students within the school in an order corresponding to the announced vehicle locations or order in the dismissal zone;

(f) sending the ordered group of students from the school to the vehicles; and (g) releasing the ordered group of the vehicles from the dismissal zone.

10. The method of claim 9 further comprising using a bar code reader for scanning a dismissal card.

11. The method of claim 10 wherein the dismissal card is displayed by a vehicle.

12. The method of claim 11 wherein the dismissal card can be transferred to a plurality of vehicles.

13. The method of claim 9 further comprising scanning a student identifier to confirm the identity of the student matching information of the remotely readable electronic identifier of the vehicle.

14. The method of claim 9 further comprising using facial recognition software to confirm the authorization of a vehicle driver or vehicle occupant to pick up the student.

15. The method of claim 9 using an RFID tag reader to identify each vehicle.

16. A safe and controlled transfer of custody of identified students from school to custodian vehicle method comprising the steps of:

(a) electronically monitoring dismissal cards displayed on vehicles entering a dismissal zone;

(b) verifying the vehicles are custodian vehicles by electronically scanning dismissal cards displayed by each vehicle and verifying the scanned information with a database;

(c) directing each verified custodian vehicle to a designated position or order of group of custodian vehicles in the dismissal zone and entering the position of each vehicle in the database;

(d) electronically identifying and directing the assembly of students designated by the database to be transferred to each positioned custodian vehicle wherein the order of grouping of students within the school building corresponds to the custodian vehicle position;

(e) monitoring the exiting of the identified and assembled students from the school building and transfer to the custody of the appropriate custodian vehicle within the group of custodian vehicles; and (f) releasing the custodian vehicles from the dismissal zone.

17. The method of claim 16 wherein the releasing of custodian vehicles includes opening a gate.

18. The method of claim 16 further comprising creating a video record of the entry of vehicles into the dismissal zone and transfer of custody of students to the vehicles.

19. The method of claim 18 wherein the video record includes an image of each vehicle license plate.

20. The method of claim 18 wherein the video record includes an image of each vehicle driver.

* * * * *